United States Patent [19]

Holstead et al.

[11] 4,173,478

[45] Nov. 6, 1979

[54] PHOTOGRAPHIC MATERIALS COMPRISING AZO SENSITIZING DYES

[75] Inventors: Colin Holstead, Abbots Langley; Kenneth N. Kilminster, Linslade Leighton Buzzard; Michael J. Simons, Eastcote Ruislip, all of England

[73] Assignee: Eastman Kodak Company, Rochester, N.Y.

[21] Appl. No.: 929,879

[22] Filed: Jul. 31, 1978

Related U.S. Application Data

[62] Division of Ser. No. 846,665, Oct. 28, 1977.

[51] Int. Cl.$^2$ .............................................. G03C 1/02
[52] U.S. Cl. ................................... 430/353; 430/591; 430/617

[58] Field of Search ............... 96/114.1, 67, 139, 66 T

[56] References Cited

U.S. PATENT DOCUMENTS

| | | | |
|---|---|---|---|
| 3,666,477 | 5/1972 | Goffe | 96/114.1 |
| 3,870,523 | 3/1975 | Ikenoue et al. | 96/139 |
| 3,909,271 | 9/1975 | Ikenoue et al. | 96/114.1 |
| 4,081,278 | 3/1978 | Dedinas et al. | 96/67 |

*Primary Examiner*—J. Travis Brown
*Attorney, Agent, or Firm*—Richard E. Knapp

[57] ABSTRACT

Certain azo compounds are useful as spectral sensitizing dyes in photographic silver halide materials, and particularly in photothermographic materials. These azo compounds comprise moieties capable of forming substantially insoluble silver salts thereby substantially improving sensitization of silver halides.

22 Claims, No Drawings

PHOTOGRAPHIC MATERIALS COMPRISING AZO SENSITIZING DYES

This is a division of application Ser. No. 846,665, filed Oct. 28, 1977.

BACKGROUND OF THE INVENTION

1. Field of the Invention

This invention relates to certain azo spectral sensitizing dyes for photographic and photothermographic silver halide materials. In one of its aspects, it relates to photographic silver halide compositions and elements containing certain azo sensitizing dyes. In another of its aspects, this invention relates to a photothermographic element suitable for processing with heat containing photographic silver halide in reactive association with a reducing agent, a silver salt oxidizing agent, and certain azo spectral sensitizing dyes. It further relates to a photothermographic composition having the described components and a method for developing an image in such material in the absence of processing solutions.

2. Description of the State of the Art

Various classes of dyes, such as cyanines, merocyanines, phthaleins, acridines, diphenylmethanes, triphenylmethanes, anthraquinones and styryls are well known as spectral sensitizers for conventional silver halide photographic materials.

It is also known to develop a latent image in a photothermographic element using thermal processing. After imagewise exposure, the resulting latent image in the photothermographic element is developed and, in some cases, stabilized, merely by uniformly heating the photothermographic element. Certain photothermographic materials for producing an image in color are also known. After imagewise exposure of these photothermographic materials, images can be developed by merely heating the elements to moderately elevated temperatures for a few seconds.

It is further known to use non-azo spectral sensitizers in photothermographic materials. These are described, for instance, in U.S. Pat. No. 3,801,321 of Evans et al, issued Apr. 2, 1974. A continuing need has existed for new classes of spectral sensitizers for photothermographic materials, especially silver halide photothermographic materials.

Azo dyes have been useful as dyestuffs for fibers, paints, varnishes and printing inks for many years. The use of certain azo dyes in electrophotographic materials is also known.

British Pat. No. 1,253,933 published Nov. 17, 1971 relates to certain azo dyes having pyrazolotriazole moieties which are useful as spectral sensitizers in conventional photographic silver halide emulsions. No use of such dyes in photothermographic materials is taught or suggested.

U.S. Pat. No. 3,870,523 of Ikenone et al, issued Mar. 11, 1975 relates to heat developable photographic materials comprising azo dye sensitizers which have the general formulae $Ar_1—N=N—Ar_2$ or $A_3—N=N—Ar_4—N=N—Ar_5$ wherein $Ar_1$, $Ar_2$, $Ar_3$ and $Ar_5$ are substituted or unsubstituted aryl groups and $Ar_4$ is arylene. This reference fails to teach or suggest the azo sensitizers useful in the photographic and photothermographic elements of the present invention.

Azo dyes as a class are generally poor spectral sensitizers for silver halide photographic and photothermographic materials. However, they are sometimes used in photothermographic materials when conventional sensitizing dyes are unsuitable or inadequate.

Therefore, it has been desirable to provide improved photographic and photothermographic materials comprising azo spectral sensitizing dyes, particularly when non-azo spectral sensitizers do not provide satisfactory results in such materials. It has been further desirable to use sensitizing dyes which absorb readily to the silver halide grains and which cannot be readily displaced from the grains by chemicals commonly incorporated into photographic and photothermographic materials.

SUMMARY OF THE INVENTION

It has been found, according to the invention, that particular azo compounds, as described herein, provide desired spectral sensitization in photographic silver salt materials. More particularly, these effects are useful in photothermographic materials, especially those photothermographic materials containing photographic silver halide in reactive association with an image-forming combination comprising a silver salt oxidizing agent with a reducing agent, without significantly adversely affecting desired properties. These particular azo spectral sensitizing dyes are strongly absorbed to silver halide grains, and hence, do not wander from emulsion layers and are unaffected by other addenda commonly in such layers.

In one aspect, a photographic element, according to the invention, comprises a support having thereon at least one photographic silver halide spectrally sensitized with at least one azo spectral sensitizing dye represented by the formula (I):

$$R-N=N+R^1)_m(L)_nR^2 \qquad (I)$$

wherein m is 0 or 1; n is 0 when m is 0 and is 0 or 1 when m is 1; R is aryl having 6 to 14 carbon atoms or $R^2$; $R^1$ is arylene having 6 to 14 carbon atoms; $R^2$ is selected from the group consisting of benzotriazole, benzimidazole, indazole, triazole, hydroxytetraazaindene, tetrazole and a 6 to 14 membered aryl having one of these moieties as a substituent; and L is a linking group selected from the group consisting of $—CONR^3—$, $—NR^3CO—$, $—SO_2NR^3—$, $—NR^3CONR^3—$, $—NR^3SO_2—$, $—CONR^3CH_2—$ and $—CONR^3R^1—$ wherein $R^3$ is hydrogen, alkyl having 1 to 22 carbon atoms or aryl having 6 to 14 carbon atoms.

Another aspect of the present invention comprises a photographic composition comprising at least one photographic silver halide spectrally sensitized with at least one azo spectral sensitizing dye represented by the formula (I) as described.

In a further aspect of the present invention, a photothermographic element comprises a support having thereon, in reactive association (a) an oxidation-reduction image-forming combination comprising (i) a silver salt oxidizing agent with (ii) a reducing agent; (b) a photosensitive component consisting essentially of photosensitive silver halide spectrally sensitized with (c) at least one azo spectral sensitizing dye represented by the formula (II):

$$A—N=N—B \qquad (II)$$

wherein A comprises at least one 5 to 12 membered heterocyclic ring having a $—NH—$ moiety as part of the ring which enables the dye to form a substantially water-insoluble silver salt, which heterocyclic ring is linked directly or through a second diazo group; and B is either a 6 to 14 membered aryl or a 5 to 12 membered heterocyclic ring.

Another aspect of the present invention comprises a photothermographic composition comprising (a) an oxidation-reduction image-forming combination comprising (i) a silver salt oxidizing agent with (ii) a reducing agent; (b) a photosensitive component consisting essentially of photosensitive silver halide spectrally sensitized with (c) at least one azo spectral sensitizing dye represented by the formula (II) as described.

Still another aspect of the invention comprises a method of developing an image in a photothermographic element comprising a support having thereon, in reactive association (a) an oxidation-reduction image-forming combination comprising (i) a silver salt oxidizing agent with (ii) a reducing agent; (b) a photosensitive component consisting essentially of photosensitive silver halide spectrally sensitized with (c) at least one azo spectral sensitizing dye represented by the formula (II) as described, said method comprising heating the element to about 100° C. to about 250° C. for a sufficient time to provide a desired developed image, such as for about 1 to about 60 seconds, typically about 2 to about 5 seconds.

DETAILED DESCRIPTION OF THE INVENTION

Photothermographic elements and compositions of the invention advantageously contain azo spectral sensitizing dyes represented by the formula:

A—N=N—B         (II)

wherein A has a 5 to 12 membered heterocyclic ring having a —NH— or "acidic nitrogen" moiety as part of the ring which enables the dye to form a substantially water-insoluble silver salt; and B is either a 6 to 14 membered aryl or a 5 to 12 membered heterocyclic ring. Exemplary heterocyclic rings for A include imidazole, triazole, tetrazole, imidazotetrazole, pyrazolotriazole, benzotriazole, benzimidazole, indazole, hydroxytetraazaindene, pyridopyrazine and the like. A can also be an aryl group having 6 to 14 carbon atoms, such as phenyl, naphthyl and the like which is substituted with any one of the 5 to 12 membered heterocyclic moieties described above. B can be any of the groups described for A, and in addition, can be a 5 to 12 membered heterocyclic group having carbon and nitrogen atoms which does not contain an —NH— acidic moiety, such as 3-isopyrazole, 4-isopyrazole, 2-isoimidazole, 2H-pyrrole, tetrazine, triazine, pyridazine and the like. The heterocyclic rings and the aryl groups can be unsubstituted or substituted with one or more substituents including halide, such as fluoride, chloride, bromide and the like; substituted or unsubstituted alkyl and alkoxy having from 1 to 22 carbon atoms, such as methyl, chloromethyl, methoxy, ethyl, 1,2-dibromoethyl, ethoxy, octyl, octoxy, and the like and isomers thereof; substituted or unsubstituted alkoxycarbonyl, having from 1 to 22 carbon atoms, such as methoxycarbonyl, ethoxycarbonyl and the like and isomers thereof; substituted or unsubstituted alkylsulfonyl, having from 1 to 22 carbon atoms, such as methylsulfonyl, ethylsulfonyl, propylsulfonyl, iso-propylsulfonyl and the like; amino; amido; hydroxy; nitro; and substituted or unsubstituted aryl, having 6 to 14 carbon atoms, such as phenyl, naphthyl, tolyl, xylyl and the like. An acid nitrogen is important in the dye as described to enable the dye to form a desired silver salt.

The heterocyclic ring of A can be linked directly to —N=N—B or can be linked through a second diazo group making the compound a bisazo dye having the formula (III)

A—N=N—B'—N=N—B wherein B' is a phenylene or heterocyclic linking moiety like the groups from which B is selected.

The photographic elements and compositions described herein comprise spectral sensitizing dyes represented by the formula:

         (I)

wherein m is 0 or 1; n is 0 when m is 0, and is 0 or 1 when m is 1; R is either aryl as described herein above for B or $R^2$; $R^1$ is arylene, having from 6 to 14 carbon atoms, such as phenylene and naphthylene which can be substituted with the same substituents described hereinabove for B; $R^2$ is selected from the group consisting of benzotriazole, benzimidazole, indazole, triazole, tetraazaindene, tetrazole and a 6 to 14 membered aryl as described above which is substituted with one of these heterocyclic moieties. These heterocyclic rings can also be substituted as described herein above for A and B. It is important, as described, that the dye (I) contains an acidic nitrogen. L is a linking roup selected from the group consisting of —CONR³—, —NR³CO—, SO₂NR³—, —NR³CONR³—, —NR³SO₂—, —CONR³CH₂—, —CONR³R¹— wherein $R^1$ is as defined above; and $R^3$ is hydrogen, alkyl or aryl as defined hereinabove.

In a preferred embodiment of the present invention, the azo spectral sensitizing dyes useful in the photothermographic elements and compositions described herein are represented by formula (I), wherein m, n, R, $R^1$ and L are as described hereinabove; and $R^2$ is selected from the group of benzotriazole, benzimidazole, indazole, triazole, hydroxytetraazaindene, tetrazole, pyrazolotriazole and a 6 to 14 membered aryl substituted with such a heterocyclic moiety, which may be substituted or unsubstituted as described hereinabove.

Exemplary azo spectral sensitizing dyes include the following compounds:

Dye 1  2-(benzotriazol-5-yl)azo-4-methoxynaphth-1-ol

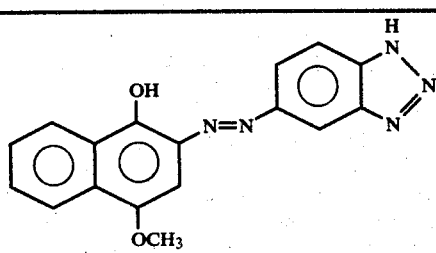

-continued

| | | |
|---|---|---|
| Dye 2 | 1-(benzotriazol-5-yl)azo-naphth-2-ol | 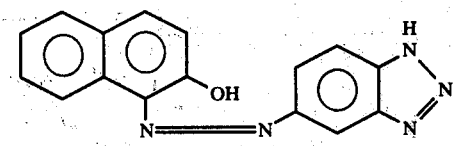 |
| Dye 3 | N-benzotriazol-5'-yl-4-(4-dimethylaminophenylazo)-benzamide | 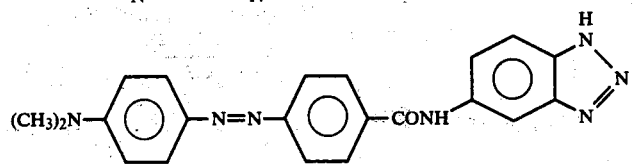 |
| Dye 4 | 2-(indazol-5-yl)azo-4-methoxynaphth-1-ol | 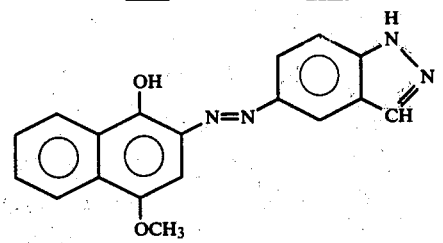 |
| Dye 5 | 2-(benzimidazol-6-yl)azo-4-methoxynaphth-1-ol | 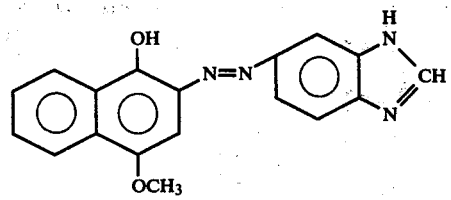 |
| Dye 6 | 4-methoxy-2-(4-triazol-5'-ylphenylazo)naphth-1-ol | 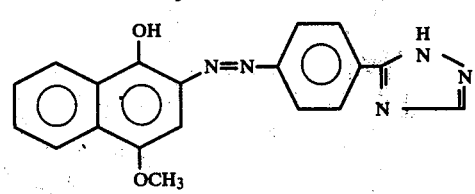 |
| Dye 7 | N-(benzotriazol-5-yl)-2-hydroxy-5-(4-methoxyphenylazo)benzamide | 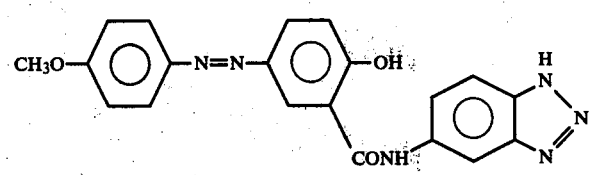 |
| Dye 8 | 2-hydroxy-N-indazol-5-yl-5-(4-methoxyphenylazo)-benzamide | 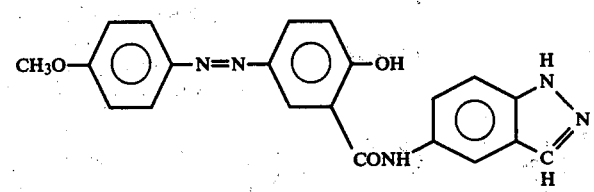 |
| Dye 9 | 2-hydroxy-N-(indazol-6-yl)-5-(4-methoxyphenylazo)-benzamide | 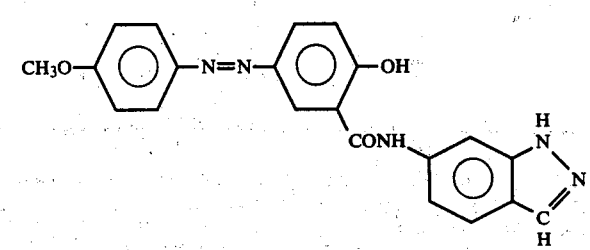 |
| Dye 10 | N-(benzimidazol-6-yl)-2-hydroxy-5-(4-methoxyphenylazo)benzamide | 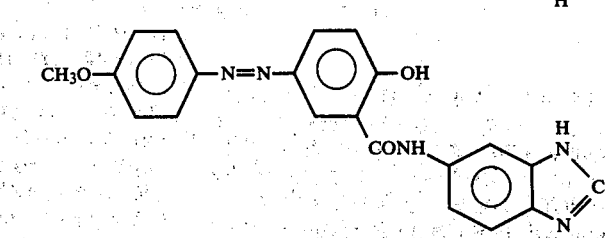 |

| | | |
|---|---|---|
| Dye 11 | 2-hydroxy-5-(4-methoxy-phenylazo)-N-(4-triazol-5'-ylphenyl)benzamide | 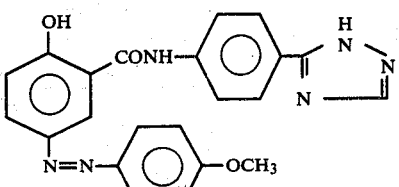 |
| Dye 12 | 2-hydroxy-N-(4-hydroxy-6-methyl-1,3,3a,7-tetraazainden-5-yl)-5-(4-methoxyphenylazo)-benzamide | 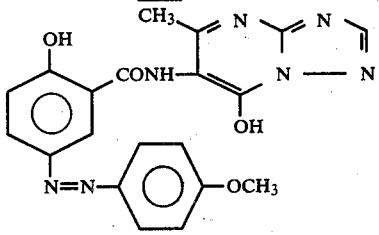 |
| Dye 13 | N-[4-methoxy-3-(6-methyl-1H-pyrazolo[3,2,c]-s-triazol-3-yl)-phenyl]-2-hydroxy-5-(4-methoxyphenylazo)benzamide | 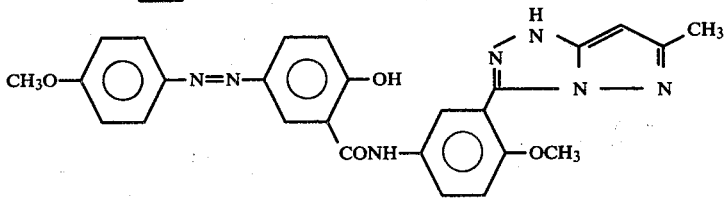 |
| Dye 14 | N-(benzotriazol-5-yl)-4-(5-hydroxy-3-methyl-1-phenylpyrazol-4-ylazo)benzamide | 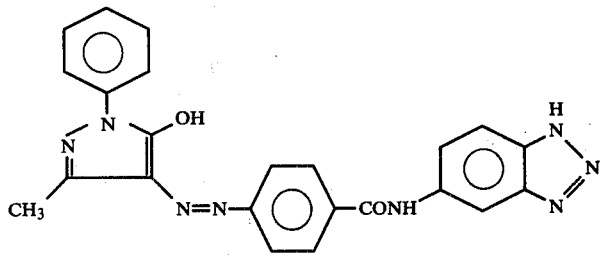 |
| Dye 15 | N-(benzotriazol-5-yl)-1-hydroxy-4-(2-methylsulfonyl-4-nitro-phenylazo)-naphth-2-amide | 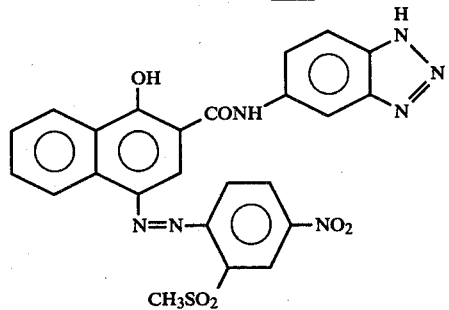 |
| Dye 16 | 2-hydroxy-5-(4-methoxy-phenylazo)-N-(1H-tetrazol-5-ylmethyl)benzamide | 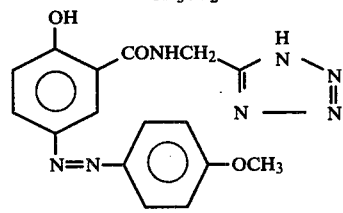 |

Generally, the dyes of formula (I) wherein m is 1 and n is 0 are prepared by methods known in the art, such as by diazotizing a compound of the formula:

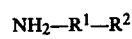

in solvents such as water, methanol, ethanol, N,N-dimethylformamide, acetic acid, tetrahydrofuran and the like, at a temperature within the range of about 0° to about 5° C. for about 1 to about 12 hours whereby the reaction is about 100% completed; and reacting the resulting diazonium salt with a coupler having the formula R—H. The dyes of formula (I) wherein m and n are both 0 are prepared similarly. The dyes of formula (I) wherein m and n are both 1 are generally prepared by one of two methods: (1) forming an azo dye of the formula R—N=N—$R^1$—$R^5$ and reacting this dye at from 0° C. to 25° C. in a solvent such as tetrahydrofuran, N,N-dimethylformamide and the like with a heterocyclic compound of the formula $R^2$—$R^6$ wherein $R^5$ and $R^6$ are substituents which react to form the desired linking group L; or (2) by diazotizing a compound of the formula NH$_2$—R$^1$—L—R$^2$ and reacting the resulting diazonium salt with a coupler of formula R—H. Typical R$^5$ and R$^6$ groups include —COCl, —NH$_2$, —NHCOCl, —SO$_2$Cl and the like. The resulting azo dyes are then filtered from the reaction media and crystallized in a suitable solvent, such as a pyridine-water mixture (1:1 molar ratio).

The most useful concentration of a particular azo dye to be used for sensitizing a photographic silver halide is best determined by preliminary testing. Typically, the concentration is within the range of about 10 to about 2000 milligrams of dye per mole of silver halide. Taking into account the approximate range of 250 to 500 for the molecular weight of the dyes, this range is equivalent to a molar range of about 0.02 to about 8 millimoles of dye per mole of silver halide. In the elements of the present invention, the azo dye concentration can also be described as from about 0.1 to about 50 milligrams per square meter of support. Amounts below these ranges can be used but they may not provide adequate sensitization. Amounts above these ranges can also be used, but with little increased sensitization effects.

By describing the silver salt formed from the reaction of the sensitizing dye with silver as substantially water-insoluble is meant that the silver salt has a very low solubility product (Ksp), i.e., less than about 10$^{-9}$ in water.

The azo spectral sensitizing dyes described herein can be used in a variety of photographic silver halide elements including radiographic elements, direct-positive elements, negative image-forming elements, thermally processable elements, multilayer multi-color elements, high contrast elements and the like. The resulting photographic elements are panchromatic or orthochromatic. Other typical elements and suitable photographic silver halide emulsions are disclosed in *Product Licensing Index*, Vol. 92, December 1971, publication 9232, pages 107-110, published by Industrial Opportunities Ltd., Homewell, Havant Hampshire, PO9 1EF, U.K., hereby incorporated by reference.

Suitable silver halide emulsions are disclosed in paragraphs I and II of *Product Licensing Index*, cited above. The silver halide emulsions can contain various addenda and vehicles as disclosed in paragraphs III–VIII and XI–XVI. They may be coated on various supports as described in paragraph X. The photographic layer or layers can be present in combination with one or more conventional subbing layers, interlayers, overcoats and the like.

The photographic elements of the present invention can be prepared and processed by any convenient conventional technique. Illustrative preparation techniques are disclosed in *Product Licensing Index*, cited above, paragraphs XVII and XVIII; and exemplary processing techniques are disclosed in paragraph XXIII.

The azo spectral sensitizing dyes disclosed herein can be incorporated in photographic silver halide emulsions or dispersions in any convenient manner known to those having skill in the art. Preferably, it is added as a solution in an organic solvent, such as methanol, ethanol, acetone, N,N-dimethylformamide and the like.

In a preferred embodiment of the present invention, the azo spectral sensitizing dyes described herein are particularly useful in photothermographic compositions and elements suitable for processing with heat to develop neutral (black) or color images.

Various reducing agents can be employed in the described photothermographic materials of this invention. These can be typical silver halide developing agents and include, for example, polyhydroxybenzenes such as hydroquinone developing agents including, for instance, hydroquinone, alkyl substituted hydroquinones, exemplified by tertiary butyl hydroquinone, methyl hydroquinone, 2,5-dimethyl hydroquinone and 2,6-dimethyl hydroquinone; catechols and pyrogallol; halo-substituted hydroquinones such as chlorohydroquinone or dichlorohydroquinone; alkoxy-substituted hydroquinones such as methoxy hydroquinone or ethoxy hydroquinone and the like. Other reducing agents which can be employed include reductone developing agents such as anhydro dihydro piperidino hexose reductone; hydroxy tetronic acid reducing agents and hydroxy tetronimide developing agents; 3-pyrazolidone developing agents such as 1-phenyl-3-pyrazolidone and 4-methyl-4-hydroxymethyl-1-phenyl-3-pyrazolidone and those described in British Pat. No. 930,572 published July 3, 1963; certain hydroxyl amine developing agents; ascorbic acid developing agents such as ascorbic acid, ascorbic acid ketals; and other ascorbic acid derivatives; phenylene diamine developing agents; certain aminophenol developing agents and the like. In addition, many phenolic or naphtholic reducing agents can be used, including bis-β-naphthols, such as 1,1'-bis-β-naphthol, 1,1'-bis-2-naphthol and the like; and sulfonamidophenols, such as 2,6-dichloro-4-benzenesulfonamidophenol and the like as described in U.S. Pat. No. 3,801,321 of Evans et al, issued Apr. 2, 1974. Combinations of reducing agents can also be employed. A suitable reducing agent is one which provides a developed image within about 6 seconds at a temperature of about 100° to 250° C. upon heating the photothermographic element containing the reducing agent.

Color developers which are useful in this invention include 2,6-dichloro and 2,6-dibromo-4-benzenesulfonamidophenol reducing agents. The 2,6-dichloro and 2,6-dibromo-4-benzenesulfonamidophenol reducing agents can contain substituent groups (in place of the benzene ring, for example) which do not adversely affect the desired sensitometric properties and dye formation in the described photothermographic elements and compositions, for example, a methyl or ethyl group.

Examples of such useful 2,6-dichloro-4-substituted sulfonamidophenol and 2,6-dibromo-4-substituted sulfonamidophenol materials are those which have the structure

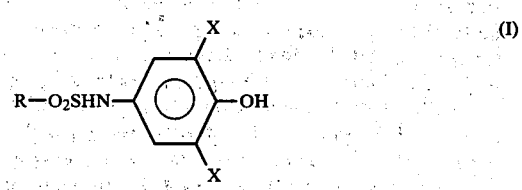

wherein X is Cl or Br and R is a group which does not adversely affect the desired sensitometric and dye-forming capabilities of the described photothermographic element or composition. Typical non-limiting examples of R include alkyl, alkaryl and aralkyl groups, which can contain from 1 to 35 or more carbon atoms in their "alkyl" portions, dialkylamino groups, preferably having alkyl groups of 1-8 carbon atoms, heterocyclic groups, aryl groups and the like.

Typical specific examples of the 2,6-dichloro and 2,6-dibromo compounds that have been found to per-form well in photothermographic elements, as described above, include

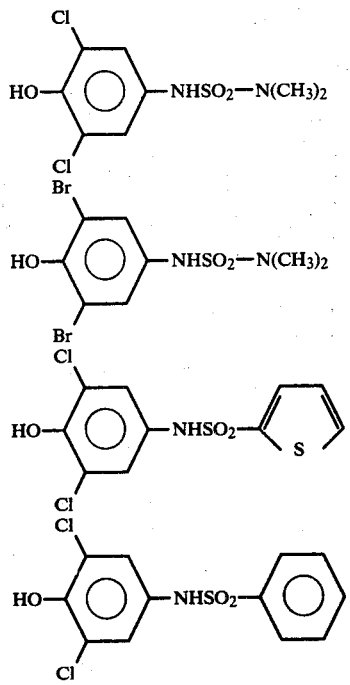

A.
B.
C.
D.

Other reducing agents which are not sulfonamidophenol reducing agents and which do not adversely affect the desired image in the photothermographic material can be used in combination with the other described components of the photothermographic elements and compositions of this invention. Other useful reducing agents include, for example, p-phenylenediamines and bis-β-naphthol reducing agents as described in U.S. Pat. No. 3,751,249 of Hiller, issued Aug. 7, 1973. Combinations of the described reducing agents can be employed if desired.

Other reducing agents which can be useful with the described 2,6-dichloro and 2,6-dibromo-4-substituted sulfonamidophenol reducing agents are phenolic (leuco base) dye reducing agents. Useful leuco base dye reducing agents are described in U.S. Pat. No. 3,985,565 of Gabrielsen et al, issued Oct. 12, 1976.

Typical useful concentrations of a reducing agent in the photothermographic elements of the present invention are within the range of from about 0.01 to about 1.0 mole of the described reducing agent per mole of silver ion which corresponds to about 0.1 to about 50.0 millimole of reducing agent per square meter of support.

An optimum concentration of this and all other components of the photothermographic materials described herein will depend upon the particular components of the described photothermographic materials, the desired image, processing temperature and the like.

The described photothermographic elements comprise a source of silver (I) ion, which is believed to be an oxidizing agent which reacts with the described reducing agent. This silver salt oxidizing agent should be resistant to darkening under illumination to prevent undesired deterioration of a developed image. Preferably, the silver salt oxidizing agent is a long-chain fatty acid. "Long chain" as employed herein is intended to mean a chain of carbon atoms containing at least 10 carbon atoms, typically 10 to 30 carbon atoms. An especially useful class of silver salt oxidizing agents is the silver salts of long-chain fatty acids containing at least 20 carbon atoms. Compounds which are useful silver salts of long-chain fatty acids are, for example, silver behenate, silver stearate, silver oleate, silver laurate, silver hydroxystearate, silver caprate, silver myristate, silver palmitate, and the like.

Other silver salt oxidizing agents which are useful in the present invention include silver benzoate, silver phthalate, silver acetate, silver acid phthalate and the like; silver phthalazinone, silver benzotriazole, silver saccharin and the like. Combinations of silver salt oxidizing agents can be useful if desired.

In the photothermographic elements of the present invention, the concentration of silver salt oxidizing agent is typically within the range of from about 0.1 to about 10.0 moles per mole of silver halide, or from about $2 \times 10^{-5}$ to about $2 \times 10^{-2}$ moles of silver salt of a fatty acid per square meter of support.

Minor proportions of oxidizing agents which are not silver salts can be used with the silver salts, if desired, such as zinc oxide, gold stearate, mercury behenate, gold behenate and the like.

It is typically useful to have a long-chain fatty acid present in the described photothermographic material to provide a desired image. For example, when silver behenate is employed as the long-chain fatty acid silver salt, it is typically desirable to have some behenic acid present to provide an improved image. A typical concentration of fatty acid is about 0.1 moles to about 2.0 moles of the fatty acid per mole of silver salt of long-chain fatty acids in the photothermographic element.

In a photothermographic element of the invention, the concentration of photosensitive silver halide is typically within the range of from about $8.5 \times 10^{-5}$ to about $1.0 \times 10^{-2}$ moles of silver halide per square meter of support. Examples of useful photographic silver halides are silver chloride, silver bromide, silver bromoiodide, silver chlorobromoiodide, silver iodide or mixtures thereof and others described hereinabove for radiation sensitive elements. The photographic silver halide is typically present with the other components of the described photothermographic elements in the form of an emulsion which is a dispersion of the photographic silver halide in a suitable binder. The photographic silver halide can be coarse or fine-grain, very fine-grain silver halide being especially useful. A composition containing the photographic silver halide can be prepared by any of the well-known procedures in the photographic art, such as single-jet emulsions, Lippmann emulsions, ammoniacal emulsions, thiocyanate or thioether ripened emulsions such as described in U.S. Pat. Nos. 2,222,264 of Nietz et al, issued Nov. 14, 1940; 3,320,069 of Illingsworth, issued May 15, 1967; and 3,271,157 of McBride, issued Sept. 6, 1966. Surface image photographic silver halide emulsions can be used if desired. If desired, mixtures of surface and internal image photographic silver halide emulsions can be used as described in U.S. Pat. No. 2,996,332 of Luckey et al, issued Apr. 15, 1961. Negative type emulsions can be used. The silver halide can be a regular grain silver halide such as described in Klein and Moisar, *Journal of Photographic Science*, Volume 12, No. 5, September-October (1964), pages 242–251.

The photosensitive silver halide can be prepared either ex situ, preferably in a non-aqueous medium as described in *Product Licensing Index*, September, 1974, publication 12537, published by Industrial Opportunities Ltd., Homewell, Havant Hampshire, P09, 1EF, UK, or in situ by reaction between a silver salt and an added halide, as described in British Patent Specification No. 1,110,146.

The described silver halide can be unwashed or washed to remove soluble salts. In the latter case, the soluble salts can be removed by chill setting and leaching or an emulsion containing the silver halide can be coagulation washed.

The described silver halide can be sensitized with chemical sensitizers such as with reducing agents; sulfur, selenium or tellurium compounds; gold, platinum or palladium compounds; or combinations of these. Suitable procedures for chemical sensitization are described, for example, in U.S. Pat. Nos. 1,623,499 of Shepard, issued Apr. 5, 1927; 2,399,083 of Waller et al, issued Apr. 23, 1946; 3,297,447 of McVeigh, issued Jan. 10, 1967 and 3,297,446 of Dunn, issued Jan. 10, 1967.

Photographic silver halide, as described herein, can be protected against loss of sensitivity during keeping. Useful antifoggants and stabilizers which can be used alone or in combination include, for example, thiazolium salts; azaindene; and mercury salts as described, for example, in U.S. Pat. No. 2,728,663 of Allen et al, issued Dec. 27, 1955; urazoles; sulfocatechols; oximes described, for example, in British Pat. No. 623,448; nitron; nitroindazoles; polyvalent metal salts described, for example, in U.S. Pat. No. 2,839,405 of Jones, issued June 17, 1958; platinum, palladium and gold salts described, for example, in U.S. Pat. No. 2,566,263 of trivelli et al, issued Aug. 28, 1951 and U.S. Pat. No. 2,597,915 of Yutzy et al, issued May 27, 1952.

If desired, the photographic silver halide can be prepared in situ in the photothermographic elements of the present invention. The photographic silver halide can be prepared in a mixture of one or more of the other components of the described photothermographic element rather than prepared separate from the described components and then admixed with them. Such a method is described, for example, in U.S. Pat. No. 3,457,075 of Morgan et al, issued July 22, 1969. For example, the photographic silver halide can be prepared with a silver salt oxidizing agent such as a silver salt of a fatty acid prior to admixture of the photographic silver halide and silver salt of a fatty acid to other components of the photothermographic materials as described. In this preparation, a halide salt can be added to a suspension of the silver salt of a fatty acid to form a desired photographic silver halide. A useful reaction medium includes water or other solvents which do not interfere with the desired reaction.

A photothermographic element as described can also contain various synthetic polymeric binders alone or in combination as vehicles or binding agents and in various layers. Suitable materials are typically hydrophobic, but hydrophilic materials can be useful. They are transparent or translucent and include such substances as cellulose derivatives and synthetic polymeric substances such as polyvinyl compounds which are compatible with the described components of the photothermographic elements of the invention. Other synthetic polymeric materials which can be employed include dispersed vinyl compounds such as in latex form and particularly those which increase dimensional stability of photographic materials. Effective polymers include water insoluble polymers of alkyl acrylates and methacrylates, acrylic acid, sulfoalkyl acrylates or methacrylates, and those which have crosslinking sites which facilitate hardening or curing as well as those which have recurring sulfobetaine units as described in Canadian Pat. No. 774,054. Useful high molecular weight materials and resins include poly(vinyl butyral), cellulose acetate butyrate, polymethylmethacrylate, ethyl cellulose, polystyrene, poly(vinyl chloride), chlorinated rubber, polyisobutylene, butadiene-styrene copolymers, vinyl chloride-vinyl acetate copolymers, copolymers of vinyl acetate, vinyl chloride and maleic acid and poly(vinyl alcohol); hydroxypropylcellulose, sodium ethyl cellulose sulfate, polyacrylamide and the like.

A so-called development modifier, also known as a toning agent or an accelerator-toning agent or an activator-toning agent, can be used in photothermographic elements according to the invention to obtain a desired image. The so-called development modifier is typically useful at a concentration of about 0.01 moles to about 0.1 moles of development modifier per mole of silver salt oxidizing agent in the photothermographic material according to the invention. A typical useful so-called development modifier is a heterocyclic compound containing at least one nitrogen atom described as a toning agent in Belgian Pat. No. 766,590 issued June 15, 1971. Typical development modifiers include, for example, phthalimide, N-hydroxyphthalimide, N-hydroxy-1,8-naphthalimide, N-potassium phthalimide, N-mercury phthalimide, succinimide and N-hydroxysuccinimide. Other so-called development modifiers which can be employed include 1-(2H)-phthalazinone, 2-acetyl-phthalazinone and the like. If desired, combinations of development modifiers can be employed in the described photothermographic materials.

Color-forming materials, such as couplers, can be also used in the described photothermographic elements. The oxidized form of the reducing agent, preferably a sulfonamidophenol reducing agent, reacts with the coupler to form a dye imagewise in the exposed photothermographic element upon overall heating. Useful color-forming couplers are disclosed in, for example, U.S. Pat. Nos. 2,369,489; 2,875,057; 3,265,506; 2,474,293; and 2,772,162 as well as in many of the other publications referred to in Paragraph XXII "Color Materials", page 110 of *Product Licensing Index*, Vol. 92, December 1971, published by Industrial Opportunities Ltd., Homewell, Havant Hampshire, P09 1EF, UK and on pages 822–825, Vol. 5, Kirk-Othmer, "Encyclopedia of Chemical Technology" and in Glafkides "Photographic Chemistry", Vol. 2, pages 596–614.

In the photothermographic elements of the present invention, the concentration of each color-forming coupler used is typically within the range of from about 0.25 to about 4 moles per mole of reducing agent.

It is believed that upon imagewise exposure the latent image formed in the photothermographic material increases the reaction rate between the components of the photothermographic material upon heating. It is believed that this enables a lower processing temperature to be employed for developing an image which otherwise would not be possible.

The term "in reactive association" is intended to mean herein that the components of the photothermographic material are in a location with respect to each other which enables this desired lower processing temperature and provides a more useful developed image.

A photothermographic element, according to the invention, can have more than one layer, if desired. If desired, one or more components of the photothermographic element, as described, can be in one or more layers of the element. For example, the photothermographic element can contain an overcoat layer of a polymer, such as an acrylamide polymer, and/or a layer between the support and the photographic layer. In some cases it can be desirable to include certain percentages of the reducing agent, and/or silver salt of the fatty acid and/or photographic silver halide, and/or toning agent, and/or antibronzing agent in the described layers. This can, in some cases, for example, reduce migration of certain components throughout the layers of the photothermographic element.

The photothermographic layers and other layers of a photothermographic element, according to the invention can be coated on a wide variety of supports. Typical supports include cellulose nitrate film, cellulose ester film, poly(vinyl acetal) film, polystyrene film, poly(ethylene terephthalate) film, polycarbonate film and related films or resinous materials, as well as glass, paper, metal and the like. Typically, a flexible support is employed, especially a paper support which can be partially acetylated or coated with baryta and/or an α-olefin polymer, particularly a polymer of an α-olefin containing 2 to 10 carbon atoms such as polyethylene, polypropylene, ethylenebutene copolymers and the like. In the case of photothermographic materials, it is necessary to use a support that can withstand the processing temperatures employed without adversely affecting the desired sensitometric properties.

Hardenable layers of a photothermographic element, as described, can be hardened by various organic or inorganic hardeners alone or in combination, such as aldehydes, ketones, and the like which do not adversely affect the sensitometric properties of the photothermographic materials. Hardeners which cause adverse reduction of the described composition should be avoided.

The photothermographic elements and materials according to the invention, can contain addenda and layers commonly employed in photothermographic elements, such as antistatic and/or conducting layers, plasticizers and/or lubricants, surfactants, matting agents, brightening agents, light-absorbing materials, filter dyes, antihalation dyes and absorbing dyes, and the like, as described in *Product Licensing Index*, Item 9232, pages 107–110, December 1971, published by Industrial Opportunities Ltd., Homewell, Havant Hampshire, PO9 1EF, UK.

The various components of the photothermographic materials of the invention can be added from water solutions or suitable organic solvent solutions can be used. The components can be added using various procedures known in the photographic art.

The photothermographic layer and/or other layers of a photothermographic element, according to the invention, can be coated by various coating procedures including dip coating, air-knife coating, curtain coating or extrusion coating using hoppers of the type described in U.S. Pat. No. 2,681,294 of Beguin, issued June 15, 1954. If desired, two or more layers can be coated simultaneously by procedures known in the art.

A visible image on a photothermographic element, according to the invention, can be produced after imagewise exposure within a short time by merely moderately overall heating the photothermographic element. For instance, a visible image on a photothermographic element, according to the invention, can typically be produced within a few seconds, e.g., about 1 to about 60 seconds after exposure by heating the element to about 100° C. to about 250° C., typically about 130° C. to about 180° C. Usually, the time of heating is less than about 20 seconds, such as about 2 to 5 seconds at a temperature of about 160° C. Optimum time of heating and optimum temperature of heating can be determined employing test procedures well known in the art.

In developing an image in a photothermographic element, according to the invention, increasing or decreasing the length of time of heating can enable use of a higher or lower temperature within the described range.

Heating of the photothermographic element can be carried out employing various heating means. These include any suitable means which provides the desired temperature within the desired time, such as a hot metal block, heated roller, plate or the like.

Processing is usually carried out under ambient conditions of pressure and humidity. Pressures and humidity outside normal atmospheric conditions can be employed if desired; however, normal atmospheric conditions are preferred.

Various exposure means can be employed for providing a latent image in the described photothermographic materials. While the photothermographic materials are typically sensitive to the ultraviolet and blue regions of the spectrum, various exposure means can be employed for providing exposure not only in this range of sensitivity but other ranges of the spectrum. The sensitizers disclosed herein extend sensitivity beyond the intrinsic sensitivity of the photothermographic materials. Typically, the photothermographic element is exposed employing a visible light source.

The pH of a photothermographic composition employed, according to the invention, can vary. In an aqueous formulation, it is typically less than about 7, such as about 1.5 to about 6.

The following preparative methods are included to illustrate how sensitizing azo dyes useful in the present invention can be prepared.

PREPARATION 1

Preparation of 2-(benzotriazol-5-yl)azo-4-methoxynaphth-1-ol (Dye 1)

5-Aminobenzotriazole (4.3 g) was dissolved in a mixture of concentrated hydrochloric acid (24 ml) and water (100 ml) and diazotized at 0° C. with a solution of sodium nitrite (2.2 g) in water (15 ml). The resulting diazonium solution was added at 0° C. to 4-methoxynaphth-1-ol (5.3 g) dissolved in 3 N sodium hydroxide (90 ml) containing sodium acetate (20 g). The resulting mixture was stirred for one hour at 0° C. and then acidified with hydrochloric acid. The dye was filtered off and crystallized in a pyridine/water mixture to give pure material (7.4 g), m.p. 254° C., λmax (methanol)=516 nm.

PREPARATION 2

Preparation of 1-(benzotriazol-5-yl)azonaphth-2-ol (Dye 2)

5-Aminobenzotriazole (10 g) was diazotized as in Preparation 1 and the resulting diazonium solution was added at 0° C. to naphth-2-ol (10.75) dissolved in 3 N sodium hydroxide (185 ml) containing sodium acetate (100 g). The resulting mixture was stirred for 90 minutes and acidified with hydrochloric acid. The dye was filtered off and recrystallized in a pyridine/water mixture to give pure material (18.6 g), m.p. 250°, λmax (methanol)=475 nm.

PREPARATION 3

Preparation of N-(benzotriazol-5-yl)-4-(4-dimethylaminophenylazo)-benzamide (Dye 3)

A mixture of 5-aminobenzotriazole (0.47 g), 4-(N,N-dimethylamino)-phenylazobenzoyl chloride, hydrochloride (1.13 g) and N,N-dimethylaniline (0.84 g) in dry tetrahydrofuran was stirred overnight and the resulting precipitate was filtered off and recrystallized in a dimethylformamide/water mixture to give pure dye, 0.73 g, m.p. 246°, λmax (methanol)=435 nm.

PREPARATION 4

Preparation of 2-(indazol-5-ylazo)-4-methoxynaphth-1-ol (Dye 4)

5-Aminoindazole was diazotized and coupled with 4-methoxynaphth-1-ol similar to the method described in Preparation 1. The product was crystallized in aqueous pyridine, m.p. 240° decomp., λmax (methanol)=523 nm.

PREPARATION 5

Preparation of 2-(benzimidazol-6-ylazo)-4-methoxynaphth-1-ol (Dye 5)

6-Aminobenzimidazole was diazotized and coupled with 4-methoxy-naphth-1-ol similar to the method described in Preparation 1. The product was crystallized in aqueous pyridine, m.p. 235° decomp., λmax (methanol)=525 nm.

PREPARATION 6

Preparation of 4-methoxy-2-(4-triazol-5'ylphenylazo)naphth-1-ol (Dye 6)

5-(4-Aminophenyl)triazole was diazotized and coupled with 4-methoxynaphth-1-ol similar to the method described in Preparation 1. The product was crystallized in aqueous pyridine, m.p. 303°-4°, λmax (methanol)=510 nm.

PREPARATION 7

Preparation of N-(benzotriazol-5-yl)-2-hydroxy-5-(4-methoxyphenylazo)benzamide (Dye 7)

5-(4-Methoxyphenylazo)salicoyl chloride (1.46 g) in dry tetrahydrofuran (10 ml) was added dropwise with stirring to a solution of 5-aminobenzotriazole (0.67 g) in dry tetrahydrofuran (15 ml) and dimethylaniline (0.61 g). After 2-3 hours the mixture was poured into water and the solid removed by filtration. The product was crystallized in aqueous pyridine as yellow plates of the monohydrate (1.5 g, 81%), m.p. 275°-6°, λmax (methanol)=352 nm.

PREPARATION 8

Preparation of 2-hydroxy-N-(indazol-5-yl)-5-(4-methoxyphenylazo)-benzamide (Dye 8)

5-(4-Methoxyphenylazo)salicoyl chloride and 5-aminoindazole were reacted under the conditions described in Preparation 7 to form 2-hydroxy-N-(indazo-5-yl)-5-(4-methoxyphenylazo)benzamide. The product was crystallized in aqueous pyridine, m.p. 276°-7°, λmax (methanol)=348 nm.

PREPARATION 9

Preparation of 2-hydroxy-N-(indazol-6-yl)-5-(4-methoxyphenylazo)-benzamide (Dye 9)

5-(4-Methoxyphenylazo)salicoyl chloride and 6-aminoindazole were reacted together as described in Preparation 7. The product was crystallized in aqueous pyridine, m.p. 279°, λmax (methanol)=350 nm.

PREPARATION 10

Preparation of N-(benzimidazol-6-yl)-2-hydroxy-5-(4-methoxyphenylazo)benzamide (Dye 10)

5-(4-Methoxyphenylazo)salicoyl chloride and 6-aminobenzimidazole were reacted together as described for Preparation 7. The product was crystallized in aqueous pyridine, m.p. 274°, λmax (methanol)=350 nm.

PREPARATION 11

Preparation of 2-hydroxy-5-(4-methoxyphenylazo)-N-(4-triazol-5'-ylphenyl)benzamide (Dye 11)

5-(4-Methoxyphenylazo)salicoyl chloride and 5-(4-aminophenyl)triazole were reacted together as described in Preparation 7. The product was crystallized in aqueous pyridine, m.p. 268°, λmax (methanol)=352 nm.

PREPARATION 12

Preparation of N-[4-methoxy-3-(6-methyl-1H-pyrazolo[3,2-c]-s-triazol-3-yl)phenyl]-2-hydroxy-5-(4-methoxyphenylazo)benzamide (Dye 13)

N-[3-(1-Acetyl-6-methyl-1H-pyrazolo[3,2-c]-s-triazol-3-yl)-4-methoxyphenyl]-2-hydroxy-5-(4-methoxyphenylazo) benzamide (1.4 g) was dissolved in methanol (100 ml) and a solution of sodium hydroxide (1.0 g) in water (30 ml) added. After stirring for 15 minutes the solution was acidified with glacial acetic acid when a gelatinous precipitate of the product appeared. This was removed by filtration, washed with water and crystallized in aqueous pyridine (850 mg; 66%), m.p. 295°-6°, λmax (methanol)=350 nm.

PREPARATION 13

Preparation of N-(benzotriazol-5-yl)-4-(5-hydroxy-3-methyl-1-phenylpyrazol-4-ylazo)benzamide (Dye 14)

A mixture of 5-aminobenzotriazole (0.78 g), 4-(5-hydroxy-3-methyl-1-phenylpyrazol-4-ylazo)benzoyl chloride (2.0 g) and N,N-dimethylaniline (0.71 g) in dry tetrahydrofuran (15 ml) was stirred overnight and water (50 ml) was added. The precipitate was filtered and crystallized in aqueous pyridine (1.9 g), m.p. 285° decomp., λmax (methanol)=396 nm.

PREPARATION 14

Preparation of N-(benzotriazol-5-yl)-1-hydroxy-4-(2-methylsulphonyl-4-nitrophenylazo)naphth-2-amide (Dye 15)

2-Methylsulphonyl-4-nitroaniline (0.66 g) was diazotized in a mixture of 3:1 v/v glacial acetic acid:propionic acid (40 ml) by adding sodium nitrite (0.21 g) in concentrated sulphuric acid (2.5 ml) dropwise a 0° C. The resulting diazonium solution was added to N-(benzotriazol-5-yl)naphth-2-amide (1.0 g) dissolved in 3:1 v/v glacial acetic acid:propionic acid (100 ml) containing ammonium acetate (16.2 g) and the mixture was stirred at room temperature for one hour. The mixture was poured onto ice and the product was filtered and crystallized in aqueous pyridine. Yield 1.16 g, m.p. 260° decomp., λmax (methanol)=577 nm.

PREPARATION 15

Preparation of 2-hydroxy-N-(4-hydroxy-6-methyl-1,3,3a,7-tetraazainden-5-yl)-5-(4-methoxyphenylazo)benzamide (Dye 12)

5-Amino-4-hydroxy-6-methyltetraazaindene (0.5 g) was dissolved in dry N,N-dimethylformamide (10 ml) and dimethylaniline (0.37 g) added. 5-(4-Methoxyphenylazo)salicoyl chloride (0.88 g) was added portionwise at room temperature with stirring. After 12 hours the mixture was poured into iced dilute hydrochloric acid and the crude product collected, washed with water and dried. The material was extracted with a large volume of ether and crystallized in aqueous ethanol as the monohydrate (0.8 g, 61%), m.p. 323°–324° decomp., λmax (methanol)=354 nm.

PREPARATION 16

Preparation of 2-hydroxy-5-(4-methoxyphenylazo)-N-(1H-tetrazol-5-ylmethyl)benzamide (Dye 16)

5-(4-Methoxyphenylazo)salicoyl chloride and 5-aminomethyltetrazole were reacted together under the conditions described for the preparation of Dye 6 to form Dye 16, m.p. 220°–225° decomp., after crystallization from aqueous acetic acid, λmax (methanol)=350 nm.

The following examples are included to illustrate the present invention.

EXAMPLE 1

Use of Dyes in Photothermographic Elements

This example illustrates a preferred embodiment of the present invention notably photothermographic materials having azo dyes therein; and is a comparison of those dyes with several outside the scope of the claims. The following dispersion was ball-milled for 18 hours:

| | |
|---|---|
| 50 mol % silver behenate | 3.0 g |
| 50 mol % behenic acid | 3.0 g |
| 'Butvar' B-76* | 0.3 g |
| Dichloromethane | 30 ml |

*'Butvar' is a trademark of the Monsanto Company, U.S.A., and is a polyvinylbutyral.

The following solution was made up:

| | | |
|---|---|---|
| 2,6-Dichloro-4-benzenesulphonamidophenol | 0.70 | g |
| N-Hydroxy-1,8-naphthalimide | 0.018 | g |
| 'Butvar' B-76 | 4.0 | g |
| Methanol | 10 | ml |
| Dichloromethane | 80 | ml |
| Polydimethylsiloxane, 2% by weight solution in toluene | 0.4 | ml |

Portions (7 ml) of this solution were taken and varying quantities of various sensitizing dyes dissolved therein. To these portions were added 0.40 ml each of a silver bromide dispersion or emulsion in acetone. The particular details of this emulsion are as follows:

Type: pure silver bromide, prepared and redispersed in acetone, peptized by 'Butvar' B-76 (see *Product Licensing Index*, September 1974, Publication 12537, published by Industrial Opportunities Ltd., Homewell, Havant Hampshire, P09 1EF, UK).

Grain shape and size: approximately cubic, 800 Å edge average.

Silver bromide concentration: 0.37 moles/kg

'Butvar' B-76 concentration: 33 g/kg (approx.)

Lithium trifluoroacetate concentration: 0.003 M

The resulting mixtures were allowed to stand for a few minutes. To each mixture was added 2.5 ml of the silver behenate dispersion described above. After mixing, each composition was coated at approximately 100 ml/m² on photographic paper base, and each coating was dried.

The coatings made in this way were exposed on a wedge spectrograph and subsequently developed by heating for 5 seconds at 120° C. with a heated curved aluminum block. An image of that part of the visible spectrum to which each coating was sensitive was produced. Table I below tabulates the results of these evaluations. Sensitivity of the coatings beyond a wavelength of 480 nm indicates spectral sensitization by the incorporated dye. Results in the table below are noted for the optimum quantity of dye used.

Dyes A-D in Controls A-D lacking a heterocyclic "acidic" nitrogen were compared to those within the scope of the present invention having such a heterocyclic nitrogen. It can be seen from Table I that these azo compounds did not provide the spectral sensitizing found with dyes within the scope of the invention.

Dyes A-D were prepared in the following manner.

Dye A: 4-Methoxy-2-phenylazonaphth-1-ol

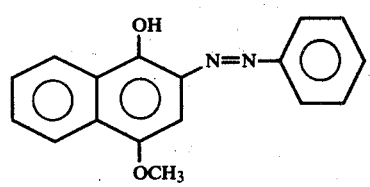

Aniline was diazotized and coupled with 4-methoxynaphth-1-ol by a method similar to that used in preparing Dye 1. The product was crystallized from aqueous pyridine m.p. 137°, λmax (methanol)=514 nm.

Dye B: 2-Hydroxy-5-(4-methoxyphenylazo)benzamide

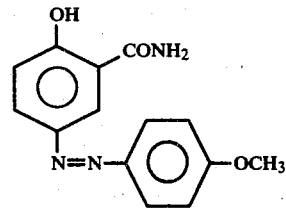

5-(4-Methoxyphenylazo)salicoyl chloride (1 g) was carefully warmed with 0.880 ammonium hydroxide (10 ml) for 10 minutes. The mixture was then acidified with glacial acetic acid and the amide removed by filtration.

The product was crystallized from ethanol (0.60 g), 65%, m.p. 231°-3°, λmax (methanol)=352 nm.

Dye C: 4-(4-N,N-Dimethylaminophenylazo)benzoic acid

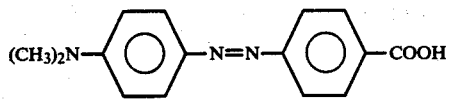

4-Aminobenzoic acid (13.7 g) was diazotized in 1.5 M hydrochloric acid (200 ml) and coupled with dimethylaniline (17.8 ml) in the presence of sodium acetate (21 g). Yield 26.8 g, m.p. 245°, λmax (methanol)=433 nm.

Dye D:
N-[3-(1-Acetyl-6-methyl-1H-pyrazolo[3,2-c]-s-triazol-3-yl)-4-methoxyphenyl]-2-hydroxy-5-(4-methoxyphenylazo)benzamide

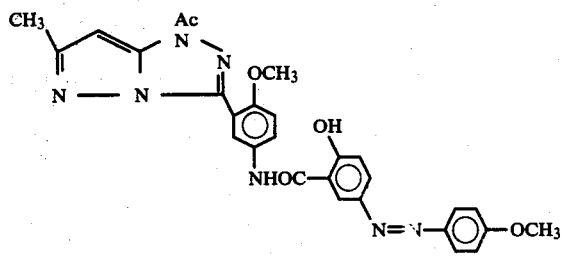

5-(4-Methoxyphenylazo)salicoyl chloride and 1-acetyl-3-(5-amino-2-methoxyphenyl)-6-methyl-1H-pyrazolo[3,2-c]-s-triazole were reacted together as described for the preparation of Dye 7. The product crystallized as the monohydrate from aqueous pyridine, m.p. 282°-3°, λmax (methanol)=350 nm.

Table I

| Dye Reference | Quantity Added (mg/m²) | Spectral Sensitization | Long Wavelength Limit of Sensizitation (nm) |
|---|---|---|---|
| A | 1.0 | very weak | 600 |
| B | 1.0 and 5.0 | none | — |
| C | 1.0 | weak | 590 |
| D | 1.0 | weak | 590 |
| 1 | 1.0 | very strong | 690 |
| 2 | 1.0 | moderate | 600 |
| 4 | 1.0 | strong | 660 |
| 5 | 0.1 | moderate | 650 |
| 3 | 1.0 | strong | 630 |
| 7 | 3.0 | moderate | 590 |
| 8 | 10 | moderate | 600 |
| 10 | 10 | strong | 580 |
| 11 | 3.0 | strong | 570 |
| 13 | 3.0 | moderte | 580 |
| 6 | 0.3 | weak | 520 |
| 9 | 0.3 | weak | 610 |
| 14 | 0.5 | weak | 610 |
| 15 | 0.5 | weak | 700 |

Some of the dyes, notably 6, 9, 14 and 15 showed weaker sensitization than others; but this result may be due to small quantities of dye being used. Dye 12 was not tested in a photothermographic element.

EXAMPLE 2

Photothermographic Material with An Azo Dye But Without A Silver Halide

This is a comparative example.

A coating was prepared as in Example 1 using Dye 1, but omitting the silver bromide emulsion. After exposure and development, no sensitivity was exhibited by the coating, indicating that the spectral sensitization by the dye involves the silver halide, and is not caused by the intrinsic light sensitivity of the dye silver salt generated in situ from the dye and the silver behenate.

EXAMPLE 3

Use of an Azo Dye in a Photothermographic Material Based on the Silver Salt of the Dye The following dispersion was ball-milled for 18 hours:

| | | |
|---|---|---|
| Silver salt of Dye 2 | 0.3 | g |
| Poly (vinyl butyral) | 0.3 | g |
| Dichloromethane | 30 | ml |
| The following solution was prepared: | | |
| Phenidone | 0.40 | g |
| Phthalazinone | 0.40 | g |
| Poly(vinyl butyral) | 1.40 | g |
| Triphenylphosphate | 0.50 | g |
| Methanol | 5 | ml |
| Dichloromethane | 35 | ml |
| Polydimethylsiloxane, 2% by weight in toluene | 0.25 | ml |

To a 5 ml portion of this solution was added varying quantities of Dye 2. Then 0.5 ml of silver bromide emulsion was added. After a few minutes, 4 ml of the silver dye salt dispersion was added and the resulting mixture was coated at approximately 100 ml/m² on film base, and the coating was dried.

Portions of the coating were exposed to a wedge spectrograph and developed by heating for 7 seconds at 140° C. on a curved aluminum block. The amounts of sensitizing dye added were 0, 0.1, 0.2, 0.5, 1.0, 2.0, 5.0 and 10 mg/m². The coating containing no sensitizing dye showed only the spectral sensitivity of silver bromide, with a long wavelength limit of about 460 nm. The coatings containing dye showed increasing spectral sensitization up to 5.0 mg/m² of dye; at 10 mg/m² there was no further increase. At these levels, the long wavelength limit of sensitization was about 620 nm.

EXAMPLE 4

Use of Azo Dyes in Silver Halide Photographic Element

An aqueous silver bromide-gelatin emulsion was used in this example. It was prepared by normal double-jet controlled pAg techniques to give cubic grains of edge length about 0.2 μm. The pH of the emulsion was 6.6, pAg was 8.0, and the dilution was 7 liters per mole AgBr.

Dye 1 was added to the emulsion as a solution in ethanol/acetone, at the rate of 300 mg/mole AgBr at 40° C. The pH remained at 6.6, but the pAg increased to 8.1. A portion of this dyed emulsion was coated at about 100 ml/m² on polyester film base (Coating A).

Silver nitrate solution was added to another portion of the dyed emulsion to bring the pAg to 4.0. The emulsion was left for five minutes, then the pAg restored to 8.0 by adding potassium bromide solution. The pH remained at 6.6 throughout. This emulsion was also coated on polyester film base at about 100 ml/m² (Coating B).

Portions of the dried coatings were exposed on a wedge spectrograph, developed in a metol-hydroquinone developer ('Kodak' D-163 Developer, 'Kodak' is a trademark) fixed in an ammonium thiosulfate rapid-fixing solution and washed. Coating A showed silver bromide sensitivity out to 480 nm and very weak dye sensitization to 620 nm. Coating B showed silver halide sensitivity out to 480 nm, and moderately strong dye sensitization out to 660 nm, with peaks at 530 and 580 nm.

The invention has been described in detail with particular reference to preferred embodiments thereof, but it will be understood that variations and modifications can be effected within the spirit and scope of the invention.

What is claimed is:

1. In a photothermographic composition comprising:
    a. an oxidation-reduction image-forming combination comprising:
        i. a silver salt oxidizing agent with
        ii. a reducing agent; and
    b. a photosensitive component consisting essentially of photosensitive silver halide spectrally sensitized with
    c. at least one spectral sensitizing dye,
the improvement wherein said dye comprises at least one azo spectral sensitizing dye represented by the formula:

wherein A comprises at least one 5 to 12 membered heterocyclic ring having a -NH- moiety as part of the ring which enables the dye to form a substantially water-insoluble silver salt, which heterocyclic ring is linked directly or through a second diazo group; and B is either a 6 to 14 membered aryl or a 5 to 12 membered heterocyclic ring.

2. The photothermographic composition of claim 1 wherein the spectral sensitizing dye is present in a concentration of from about 10 to about 2000 mg per mole of photographic silver halide.

3. The photothermographic composition of claim 1 wherein the azo spectral sensitizing dye is represented by the formula:

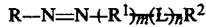

wherein m is 0 or 1; n is 0 when m is 0, and is 0 or 1 when m is 1; R is aryl having 6 to 14 carbon atoms or R²; R¹ is arylene having 6 to 14 carbon atoms; R² is selected from the group consisting of benzotriazole, benzimidazole, indazole, triazole, hydroxytetraazaindene, tetrazole, and pyrazolotriazole heterocyclic moieties and a 6 to 14 membered aryl having one of these moieties as a substituent; and L is a linking group selected from the group consisting of —CONR³—, —NR³CO—, —SO₂NR³—, —NR³CONR³—, —NR³SO₂—, —CONR³CH₂— and —CONR³R¹— wherein R³ is hydrogen, alkyl having 1 to 10 carbon atoms or aryl having 6 to 14 carbon atoms; said dye containing an acidic nitrogen in said heterocyclic moieties.

4. In a photothermographic composition comprising:
    a. an oxidation-reduction image-forming combination comprising:
        i. a fatty acid silver salt oxidizing agent with
        ii. a reducing agent; an
    b. a photosensitive component consisting essentially of photosensitive silver halide spectrally sensitized with
    c. at least one spectral sensitizing dye,
the improvement wherein said dye comprises at least one azo spectral sensitizing dye represented by the formula:

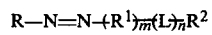

wherein m is 0 or 1; n is 0 when m is 0, and is 0 or 1 when m is 1; R is aryl having 6 to 14 carbon atoms; R² is selected from the group consisting of benzotriazole, benzimidazole, indazole, triazole, hydroxytetraazaindene, tetrazole, and pyrazolotriazole heterocyclic moieties, and a 6 to 14 membered aryl having one of the moieties as a substituent; and L is a linking group selected from the group consisting of —CONR³—, —NR³CO—, —SO₂NR³—, —NR³CONR³—, —NR³SO₂—, —CONR³CH₂— and —CONR³R¹— wherein R³ is hydrogen, alkyl having 1 to 10 carbon atoms or aryl having 6 to 14 carbon atoms; said dye containing an acidic nitrogen in said heterocyclic moiety.

5. The photothermographic composition of claim 4 wherein the spectral sensitizing dye consists essentially of 2-benzotriazol-5-ylazo-4-methoxynaphth-1-ol.

6. The photothermographic composition of claim 4 wherein the spectral sensitizing dye is present in a concentration of from about 10 to about 2000 mg per mole of photographic silver halide.

7. The photothermographic composition of claim 4 wherein the reducing agent is a sulfonamidophenol.

8. The photothermographic composition of claim 4 wherein the silver halide is silver bromide.

9. A photothermographic composition comprising:
    a. an oxidation-reduction image-forming combination comprising:
        i. a silver salt of a long-chain fatty acid with
        ii. a sulfonamidophenol reducing agent; and
    b. a photosensitive component consisting essentially of photosensitive silver bromide spectrally sensitized with
    c. a spectral sensitizing dye consisting essentially of 2-benzotriazol-5-ylazo-4-methoxynaphth-1-ol.

10. In a photothermographic element comprising a support having thereon in reactive association:
    a. an oxidation-reduction image-forming combination comprising:
        i. a silver salt oxidizing agent with
        ii. a reducing agent; and
    b. a photosensitive component consisting essentially of photosensitive silver halide spectrally sensitized with
    c. at least one spectral sensitizing dye,
the improvement wherein said dye comprises at least one azo spectral sensitizing dye represented by the formula:

wherein A comprises at least one 5 to 12 membered heterocyclic ring having a —NH— moiety as part of the ring which enables the dye to form a substantially water-insoluble silver salt, which heterocyclic ring is linked directly or through a second diazo group; and B is either a 6 to 14 membered aryl or a 5 to 12 membered heterocyclic ring.

11. The photothermographic element of claim 10 wherein the spectral sensitizing dye is present in a concentration of from about 10 to about 2000 mg per mole of photographic silver halide.

12. The photothermographic element of claim 10 wherein the azo spectral sensitizing dye is represented by the formula:

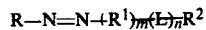

wherein m is 0 or 1; n is 0 when m is 0, and is 0 or 1 when m is 1; R is aryl having 6 to 14 carbon atoms or $R^2$; $R^1$ is arylene having 6 to 14 carbon atoms; $R^2$ is selected from the group consisting of benzotriazole, benzimidazole, indazole, triazole, hydroxytetraazaindene, tetrazole, and pyrazolotriazole moieties, and a 6 to 14 membered aryl having one of these moieties as a substituent; and L is a linking group selected from the group consisting of $-CONR^3-$, $-NR^3CO-$, $-SO_2NR^3-$, $-NR^3CONR^3-$, $-NR^3SO_2-$, $-CONR^3CH_2-$ and $-CONR^3R^1-$ wherein $R^3$ is hydrogen, alkyl having 1 to 10 carbon atoms or aryl having 6 to 14 carbon atoms; said dye containing an acidic nitrogen in said heterocyclic moiety.

13. A photothermographic element comprising a support having thereon in reactive association:
   a. an oxidation-reduction image-forming combination comprising:
      i. a fatty acid silver salt oxidizing agent with
      ii. a reducing agent; and
   b. a photosensitive component consisting essentially of photosensitive silver halide spectrally sensitized with
   c. at least one spectral sensitizing dye,
   the improvement wherein said dye comprises at least one azo spectral sensitizing dye represented by the formula:

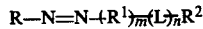

wherein m is 0 or 1; n is 0 when m is 0, and is 0 or 1 when m is 1; R is aryl having 6 to 14 carbon atoms or $R^2$; $R^1$ is arylene having 6 to 14 carbon atoms; $R^2$ is selected from the group consisting of benzotriazole, benzimidazole, indazole, triazole, hydroxytetraazaindene, tetrazole, and pyrazolotriazole heterocyclic moieties and a 6 to 14 membered aryl having one of these moieties as a substituent; and L is a linking group selected from the group consisting of $-CONR^3-$, $-NR^3CO-$, $-SO_2NR^3-$, $-NR^3CONR^3-$, $-NR^3SO_2-$, $-CONR^3CH_2-$ and $-CONR^3R^1-$ wherein $R^3$ is hydrogen, alkyl having 1 to 10 carbon atoms or aryl having 6 to 14 carbon atoms; said dye containing an acidic nitrogen in said heterocyclic moiety.

14. The photothermographic element of claim 13 wherein the azo spectral sensitizing dye consists essentially of 2-(benzotriazol-5-ylazo)-4-methoxynaphth-1-ol.

15. The photothermographic element of claim 13 wherein the azo spectral sensitizing dye is present in a concentration of from about 10 to about 2000 mg per mole of photographic silver halide.

16. The photothermographic element of claim 13 wherein the reducing agent is a sulfonamidophenol.

17. The photothermographic element of claim 13 wherein the silver halide is silver bromide.

18. A photothermographic element comprising a support having thereon in reactive association:
   a. an oxidation-reduction image-forming combination comprising:
      i. a silver salt of a long-chain fatty acid with
      ii. a sulfonamidophenol reducing agent; and
   b. a photosensitive component consisting essentially of silver bromide spectrally sensitized with
   c. a spectral sensitizing dye consisting essentially of 2-benzotriazol-5-ylazo-4-methoxynaphth-1-ol.

19. A photothermographic element comprising a support having thereon in reactive association per square meter of support:
   a. an oxidation-reduction image-forming combination comprising:
      i. from 0.02 to 20 millimoles of a silver salt oxidizing agent with
      ii. from 0.1 to 50.0 millimoles of a reducing agent; and
   b. from 0.085 to 10 millimoles of a photosensitive component consisting essentially of silver halide spectrally sensitized with
   c. a spectral sensitizing dye,
   the improvement wherein said dye comprises from 0.1 to 50 mg of an azo spectral sensitizing dye represented by the formula:

wherein A comprises at least one 5 to 12 membered heterocyclic ring having a $-NH-$ moiety as part of the ring which enables the dye to form a substantially water-insoluble silver salt, which heterocyclic ring is linked directly or through a second diazo group; and B is either a 6 to 14 membered aryl or a 5 to 12 membered heterocyclic ring.

20. The photothermographic element of claim 19 wherein the azo spectral sensitizing dye is represented by the formula:

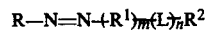

wherein m is 0 or 1; n is 0 when m is 0, and is 0 or 1 when m is 1; R is aryl having 6 to 14 carbon atoms or $R^2$; $R^1$ is arylene having 6 to 14 carbon atoms; $R^2$ is selected from the group consisting of benzotriazole, benzimidazole, indazole, triazole, hydroxytetraazaindene, tetrazole, and pyrazolotriazole heterocyclic moieties and a 6 to 14 membered aryl having one of these moieties as a substituent; and L is a linking group selected from the group consisting of $-CONR^2-$, $-NR^3CO-$, $-SO_2NR^3-$, $-NR^3CONR^3-$, $-NR^3SO_2-$, $-CONR^3CH_2-$ and $-CONR^3R^1-$ wherein $R^3$ is hydrogen, alkyl having 1 to 10 carbon atoms or aryl having 6 to 14 carbon atoms; said dye containing an acidic nitrogen in said heterocyclic moiety.

21. A method of developing an image in an exposed photothermographic element comprising a support having thereon in reactive association;
   a. an oxidation-reduction image-forming combination comprising:
      i. a silver salt oxidizing agent with
      ii. a reducing agent;
   b. a photosensitive component consisting essentially of photosensitive silver halide spectrally sensitized with
   c. at least one azo spectral sensitizing dye represented by the formula:

A—N=N—B wherein A comprises at least one 5 to 12 membered heterocyclic ring having a —NH— moiety as part of the ring which enables the dye to form a substantially water-insoluble silver salt which heterocyclic ring is linked directly or through a second diazo group; and B is either 6 to 14 membered aryl or a 5 to 12 membered heterocyclic ring; said method comprising heating the element to about 100° C. to about 250° C. until an image is developed for about 1 to about 60 seconds.

22. The method of claim 21 wherein the azo spectral sensitizing dye is represented by the formula:

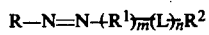

wherein m is 0 or 1; n is 0 when m is 0 and is 0 or 1 when m is 1; R is aryl having 6 to 14 carbon atoms or $R^2$; $R^1$ is arylene having 6 to 14 carbon atoms; $R^2$ is selected from the group consisting of benzotriazole, benzimidazole, indazole, triazole, hydroxytetraazaindene, tetrazole, and pyrazolotriazole heterocyclic moieties and a 6 1 to 14 membered aryl having one of these moieties as a substituent; and L is a linking group selected from the group consisting of —$CONR^3$—, —$NR^3CO$—, —$SO_2NR^3$—, —$NR^3CONR^3$—, —$NR^3SO_2$—, —$CONR^3CH_2$— and —$CONR^3R^1$— wherein $R^3$ is hydrogen, alkyl having 1 to 10 carbon atoms or aryl having 6 to 14 carbon atoms; said dye containing an acidic nitrogen in said heterocyclic moiety.

* * * * *